United States Patent
Murata

(10) Patent No.: US 11,312,180 B2
(45) Date of Patent: Apr. 26, 2022

(54) PNEUMATIC TIRE

(71) Applicant: The Yokohama Rubber Co., LTD., Tokyo (JP)

(72) Inventor: Takahisa Murata, Hiratsuka (JP)

(73) Assignee: The Yokohama Rubber Co., LTD.

(*) Notice: Subject to any disclaimer, the term of this patent is extended or adjusted under 35 U.S.C. 154(b) by 531 days.

(21) Appl. No.: 16/305,857

(22) PCT Filed: May 19, 2017

(86) PCT No.: PCT/JP2017/018888
§ 371 (c)(1),
(2) Date: Nov. 29, 2018

(87) PCT Pub. No.: WO2017/208862
PCT Pub. Date: Dec. 7, 2017

(65) Prior Publication Data
US 2019/0299719 A1 Oct. 3, 2019

(30) Foreign Application Priority Data
May 30, 2016 (JP) .............................. JP2016-107029

(51) Int. Cl.
*B60C 13/02* (2006.01)
*B60C 11/01* (2006.01)
(Continued)

(52) U.S. Cl.
CPC .............. *B60C 11/01* (2013.01); *B60C 11/03* (2013.01); *B60C 11/11* (2013.01); *B60C 13/00* (2013.01); *B60C 13/02* (2013.01); *B60C 2200/14* (2013.01)

(58) Field of Classification Search
CPC ......... B60C 11/01; B60C 11/03; B60C 13/02; B60C 13/002; B60C 13/00; B60C 13/023; B60C 2200/14
See application file for complete search history.

(56) References Cited

U.S. PATENT DOCUMENTS

D414,727 S  10/1999 Brown et al.
6,530,405 B1 * 3/2003 Brown .................... B60C 11/01
                                            152/209.16
(Continued)

FOREIGN PATENT DOCUMENTS

DE  699 01 908      2/2003
JP  S62-111205      7/1987
(Continued)

OTHER PUBLICATIONS

International Search Report for International Application No. PCT/JP2017/018888 dated Jul. 25, 2017, 4 pages, Japan.

*Primary Examiner* — Cedrick S Williams
(74) *Attorney, Agent, or Firm* — Thorpe North & Western

(57) ABSTRACT

A pneumatic tire includes a lug grooves extending in a shoulder region of a tread portion in a width direction up to a sidewall portion, a shoulder block and a side block defined by the lug grooves, in which the side block located outward of the shoulder block in the width direction is ridged higher than the shoulder block, at least a part of the lug grooves being each a closed lug groove closed by a ridge portion provided therein, the ridge portion being continuous to the side block located on both sides of the closed lug groove in the circumferential direction, the ridge portion including a first narrow groove with a smaller groove width and a smaller groove depth than the lug groove, extending in the width direction, and at least one end of the first narrow groove penetrating toward the closed lug groove or the sidewall portion.

10 Claims, 4 Drawing Sheets

(51) Int. Cl.
*B60C 11/11* (2006.01)
*B60C 13/00* (2006.01)
*B60C 11/03* (2006.01)

(56) References Cited

U.S. PATENT DOCUMENTS

| | | |
|---|---|---|
| D851,580 S | 6/2019 | Sakamoto et al. |
| 2001/0020505 A1 | 9/2001 | Zanzig et al. |
| 2002/0011293 A1 | 1/2002 | Zanzig et al. |
| 2009/0194212 A1 | 8/2009 | Bonko et al. |
| 2010/0043934 A1 | 2/2010 | Harvey |
| 2010/0147426 A1 | 6/2010 | Janesh et al. |
| 2012/0216930 A1 | 8/2012 | Matsuda |
| 2018/0154703 A1* | 6/2018 | Hayashi .................. B60C 11/03 |

FOREIGN PATENT DOCUMENTS

| | | |
|---|---|---|
| JP | H11-291718 | 10/1999 |
| JP | 2002-301903 | 10/2002 |
| JP | 3391692 | 3/2003 |
| JP | 2012-179964 | 9/2012 |
| WO | WO 99/52720 | 10/1999 |

\* cited by examiner

PNEUMATIC TIRE

TECHNICAL FIELD

The present technology relates to a pneumatic tire suitable as a tire for driving on an unpaved road and particularly relates to a pneumatic tire with highly-balanced driving performance on an unpaved road and cut resistance at a sidewall portion.

BACKGROUND ART

Pneumatic tires generally adopted for driving on an unpaved road such as uneven ground, sandy ground, or rocky ground, have a tread pattern mainly with lug grooves including a lot of edge portions or blocks and also have a large groove area. Such tires are designed to catch mud, sand, stone, rock, etc. on the road so as to achieve traction performance as well as to prevent clogging of mud, sand, or stone into a groove so as to improve driving performance on an unpaved road. In addition, there has recently been made a proposal to extend a range of a groove or a block up to a sidewall portion beyond a shoulder portion so as to provide a recess and protrusion in a region from the shoulder portion to the sidewall portion (for example, Japan Patent No. 3391692). With such tires, the recess and protrusion (groove or block) ranging over the region from the shoulder portion to the sidewall portion sinks into mud or sand on the muddy or sandy ground, contacts stone or rock on the rocky ground, and catches mud, sand, stone, rock, etc. on the rocky ground, whereby high driving performance can be achieved.

On an unpaved road (especially, on rocky ground), however, a sidewall portion is easily damaged by contact with rock, sharp stone, etc., leading to a problem that a tire including a thin rubber gauge portion (groove or recessed portion) with the recess and protrusion provided over the region from the shoulder portion to the sidewall portion as described above, fails to ensure a sufficient cut resistance. To deal with the problem, an effective solution is required, which can provide both high driving performance on an unpaved road (especially, rocky ground) and high cut resistance at the sidewall portion in a pneumatic tire including a groove or a block over the region from the shoulder portion to the sidewall portion.

SUMMARY

The present technology provides a pneumatic tire that ensures highly-balanced driving performance on an unpaved road and cut resistance at a sidewall portion.

A pneumatic tire according to the present technology includes an annular tread portion extending in a tire circumferential direction, a pair of sidewall portions provided on both sides of the tread portion, a pair of bead portions provided inward of the sidewall portions in a tire radial direction, a plurality of lug grooves extending in a shoulder region of the tread portion in a tire width direction up to the sidewall portions, and a block defined by the lug grooves. The block includes a shoulder block located on an inner side in the tire width direction, and a side block located outward of the shoulder block in the tire width direction and ridged higher than the shoulder block. At least a part of the plurality of lug grooves each include a closed lug groove being closed by a ridge portion provided therein, the ridge portion being continuous to the side block located on both sides of the closed lug groove in the tire circumferential direction, the ridge portion including a first narrow groove with a smaller groove width and a smaller groove depth than the lug groove, the first narrow groove extending in the tire width direction, and at least one end of the first narrow groove penetrating toward the closed lug groove or each of the sidewall portions.

According to the present technology, as described above, the lug groove or the block extends up to the sidewall portion beyond the shoulder region, whereby driving performance (rock performance) on rocky ground can be enhanced. In particular, a ridged side block forms an adequate recess and protrusion on an outer side (sidewall portion side) in the tire width direction, so that when the sidewall portion contacts rock, etc., the sidewall portion can catch the rock, etc., and exert high rock performance. On the other hand, a ridge portion provided in the lug groove and being continuous to the side block, can suppress occurrences of side cuts caused by contact with rock, etc., and in turn, can increase the cut resistance. At this time, the first narrow groove formed in the ridge portion can compensate for an edge that is reduced due to the formation of the ridge portion and thus, high rock performance can be achieved.

According to the present technology, it is preferable that the lug grooves not including the ridge portion and the closed lug grooves are provided alternately in the tire circumferential direction. Such an alternate arrangement of the closed lug grooves ensures both rock performance and cut resistance in a well-balanced manner.

According to the present technology, it is preferable that the side blocks be provided in a position covering a range of 30% to 45% of a tire cross-sectional height SH from an outer diameter position on a tire equator to an inner side in the tire radial direction. Such an arrangement of the side block provides an adequate recess and protrusion to a region that is more likely to contact rock, etc. upon driving on rocky ground, etc. This is advantageously effective in enhancing rock performance.

According to the present technology, it is preferable that an edge of the ridge portion on the closed lug groove side be provided within a range of 35% to 45% of a tire cross-sectional height SH from an outer diameter position on a tire equator to an inner side in the tire radial direction. Such formation of the ridge portion can enhance cut resistance by the use of the ridge portion while maintaining sufficient rock performance. This is advantageously effective in ensuring both the rock performance and the cut resistance in a well-balanced manner.

According to the present technology, it is preferable that the side block include a second narrow groove with a smaller groove width and a smaller groove depth than the lug groove, the second narrow groove extending in the tire width direction, and the second narrow groove be open at least at an inner end in the tire width direction. Such formation of the second narrow groove provides more edges in the side block. This is advantageously effective in enhancing rock performance.

According to the present technology, it is preferable that the shoulder block include a third narrow groove with a smaller groove width and a smaller groove depth than the lug groove, the third narrow groove extending in a tire width direction, the third narrow groove be open at least at an outer end in the tire width direction, and the second narrow groove and the third narrow groove be continuous to each other. Such formation of the third narrow groove provides more edges in the shoulder block. This is advantageously effective in enhancing rock performance. In particular, the continuous second and third narrow grooves function like one groove and catch rock, etc., and in turn, ensure high rock performance.

DETAILED DESCRIPTION

Configuration of embodiments of the present technology are described in detail below with reference to the accompanying drawings.

Figure 1:
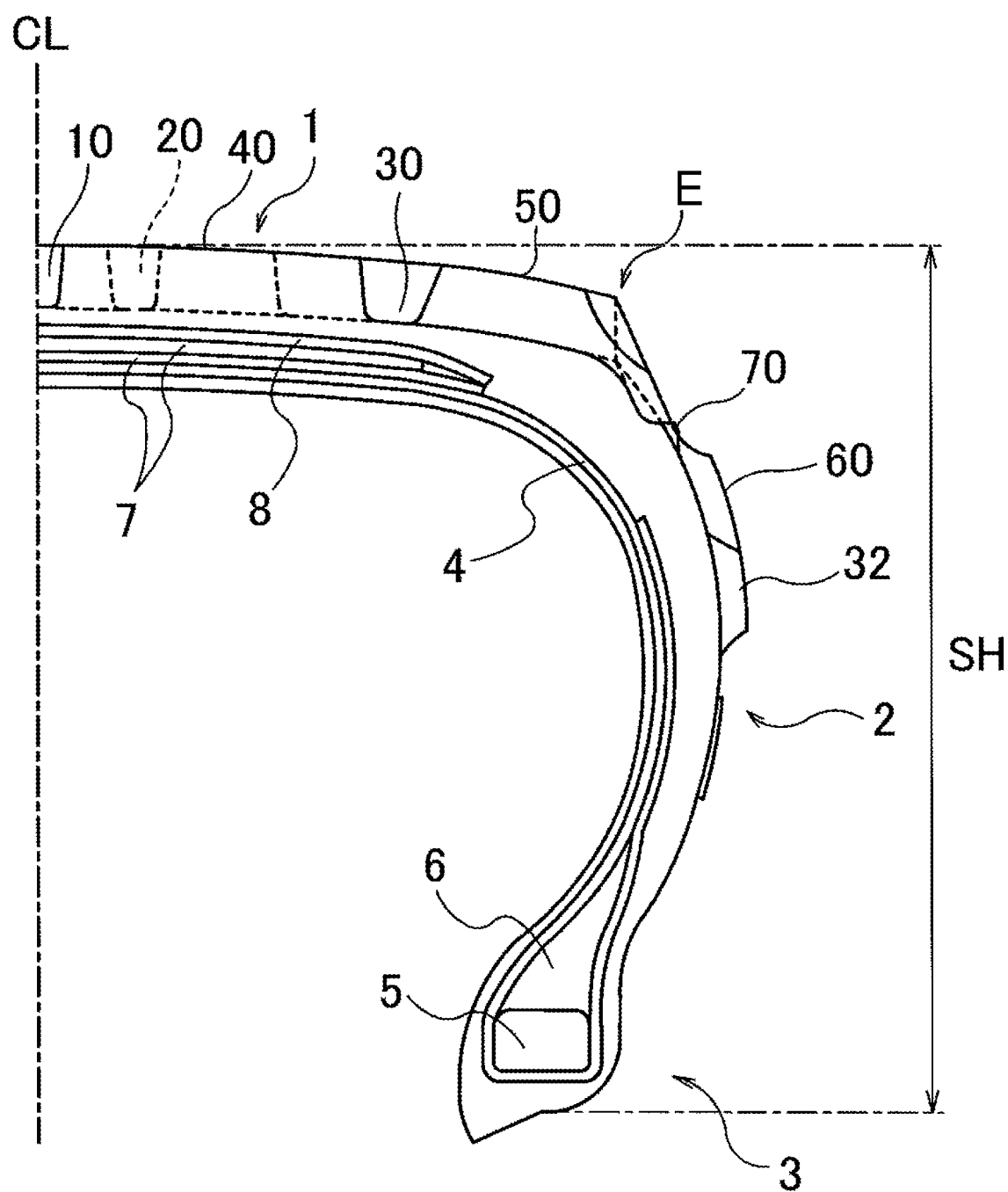
FIG. 1 is a meridian cross-sectional view of a pneumatic tire according to an embodiment of the present technology.

As illustrated in FIG. 1, the pneumatic tire of the present technology includes an annular tread portion 1 extending in a tire circumferential direction, a pair of sidewall portions 2 disposed on both sides of the tread portion 1, and a pair of bead portions 3 disposed inward of the sidewall portions 2 in the tire radial direction. Reference sign CL in FIG. 1 denotes the tire equator and reference sign E denotes a ground contact edge.

A carcass layer 4 is mounted between a left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed at the outer circumference of the bead cores 5, and each bead filler 6 is enveloped by a main body portion and a folded back portion of the carcass layer 4. On the other hand, in the tread portion 1, a plurality of belt layers 7 (two layers in FIG. 1) are embedded on the outer circumferential side of the carcass layer 4. The belt layers 7 each include a plurality of reinforcing cords that are inclined with respect to the tire circumferential direction, and the directions of the reinforcing cords of the different layers intersect each other. In these belt layers 7, the inclination angle of the reinforcing cords with respect to the tire circumferential direction is set in the range of, for example, from 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

The present technology may be applied to such a typical pneumatic tire; however, the cross-sectional structure thereof is not limited to the basic structure described above.

Figure 2:
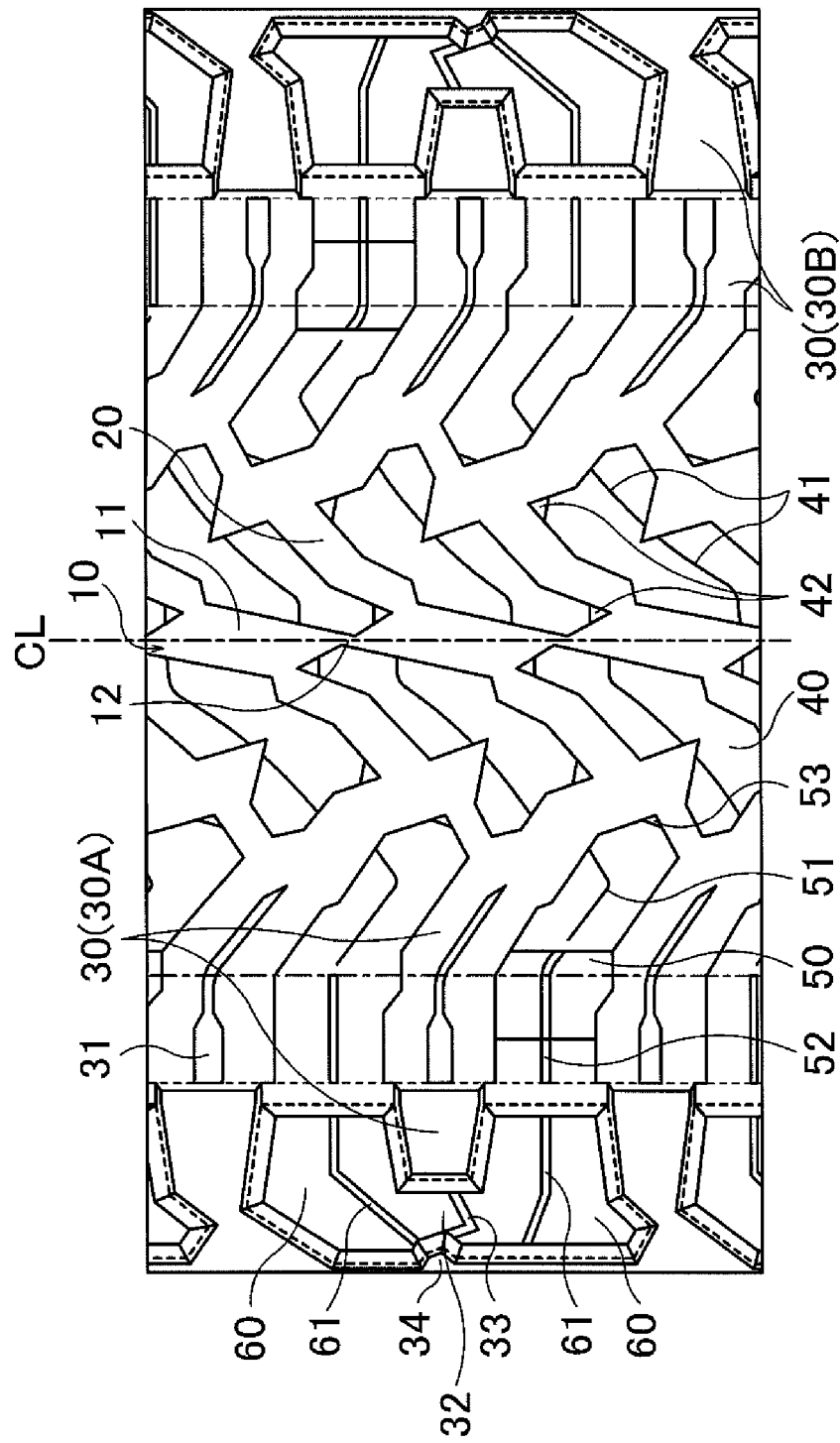
FIG. 2 is a front view illustrating a part of a tread surface of the pneumatic tire according to the embodiment of the present technology.

As illustrated in FIG. 2, a circumferential groove 10 is formed in a center region (on the tire equator CL in FIG. 2) of the tread portion 1, extending in the tire circumferential direction. Also, a plurality of inner lug grooves 20 and a plurality of outer lug grooves 30 are formed on both sides of the circumferential groove 10 at some interval in the tire circumferential direction. The circumferential groove 10, the inner lug grooves 20, and the outer lug grooves 30 define a center block 40, a shoulder block 50, and a side block 60.

The circumferential groove 10 has a varying groove width along the tire circumferential direction, in which a plurality of wide portions 11 and a plurality of narrow portions 12 are alternately formed. In particular, in the illustrated example of FIG. 2, the alternately arranged wide portions 11 and narrow portions 12 make the circumferential groove 10 appear to extend in zigzag along the tire circumferential direction. A portion (corresponding to the wide portion 11) inclined in one direction with respect to the tire circumferential direction has a relatively large groove width, while a portion (corresponding to the narrow portion 12) inclined in the other direction has a relatively small groove width.

The inner lug grooves 20 extend with some inclination in one direction with respect to the tire circumferential direction. One end (inner end in the tire width direction) of a respective inner lug groove 20 communicates with the wide portion 11 of the circumferential groove 10, and the other end (outer end in the tire width direction) communicates with the outer lug groove 30 as described later. In the illustrated example of FIG. 2, the inner lug groove 20 is inclined in one direction with respect to the tire circumferential direction while the inclination angle is accordingly changed by bending at some midpoint. In the illustrated example, the inner lug grooves 20 are formed on both sides of the circumferential groove 10 and thus, one wide portion 11 communicates with a pair of inner lug grooves 20.

The outer lug grooves 30 extend with some inclination in the other direction (opposite to the direction of the inner lug grooves 20) with respect to the tire circumferential direction. One end (inner end in the tire width direction) of a respective outer lug groove 30 communicates with the inner lug groove 20, and the other end (outer end in the tire width direction) extends toward the outer side in the tire width direction and reaches the sidewall portion 2 beyond a shoulder region. In the illustrated example of FIG. 2, the outer lug groove 30 crosses the inner lug groove 20, and the one end thereof is terminated within the center block 40 as described later. Also, in the illustrated example of FIG. 2, the outer lug groove 30 is inclined in the other direction with respect to the tire circumferential direction while the inclination angle is accordingly changed by bending at some midpoint. In the illustrated example of FIG. 1, the outer lug groove 30 includes a projection portion 31, protruding from a groove bottom, at the center of the groove bottom near the other end and extending along the outer lug groove 30. Note that the outer lug groove 30 includes a closed lug groove 30A provided, therein, with a ridge portion 32 as described later and with an open lug groove 30B that does not include the ridge portion 32 and that is open to the sidewall portion. In the illustrated example of FIG. 1, the open lug groove 30B is bent in a position corresponding to the ridge portion 32 in the closed lug groove 30A.

The center block 40 is defined by the circumferential groove 10, the inner lug groove 20, and the outer lug groove 30, and is provided in a position adjacent to the circumferential groove 10. As described above, since the one end of the outer lug groove 30 is terminated within the center block 40, in the illustrated example of FIG. 2, the center block 40 appears to have a substantially triangular notch. The center blocks 40 each include a sipe 41 one end of which communicates with the circumferential groove 10, curves within the center block 40, then crosses one end (notch) of the outer lug groove 30, and extends along the extending direction of the inner lug groove 20; and the other end of which communicates with the outer lug groove 30. A sharp edge portion adjacent to the circumferential groove 10 and the inner lug groove 20, and a sharp edge portion adjacent to the inner lug groove 20 and the outer lug groove 30 each include a chamfer 42.

Figure 3:
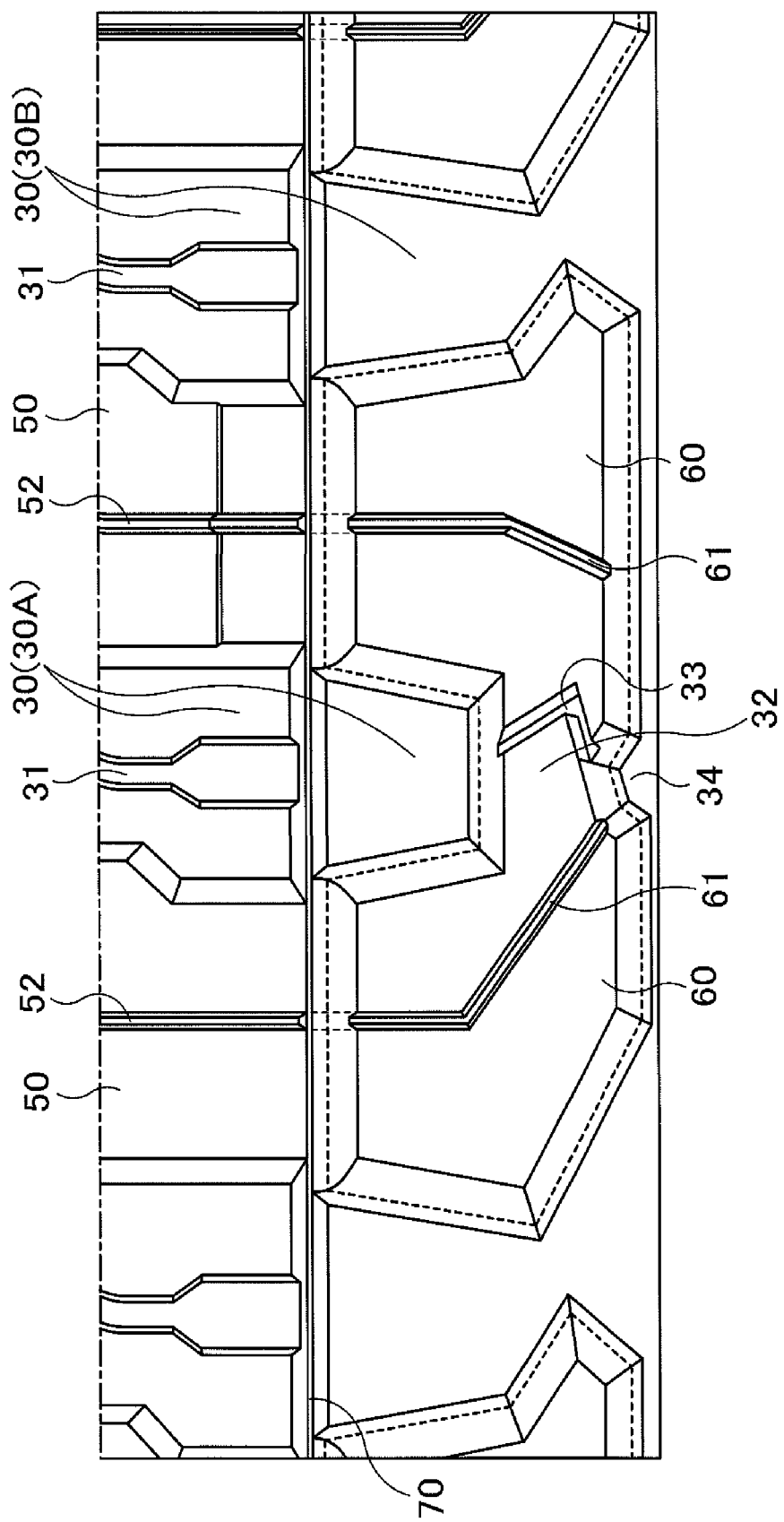
FIG. 3 is an enlarged front view illustrating a part of a shoulder block and a side block according to the present technology.

As illustrated in FIGS. 2 and 3, the shoulder block 50 is defined by the outer lug groove 30 and the inner lug groove 20, and is located between the outer lug grooves 30 adjacent to each other in the tire circumferential direction. The shoulder blocks 50 each include a sipe 51 one end of which communicates with the outer lug groove 30, curves within the shoulder block 50, and then extends along the extending direction of the outer lug groove 30; the other end of which is terminated within the shoulder block 50; and a shoulder narrow groove 52 extending from the terminal portion of the sipe 51 along the extending direction of the outer lug groove 30. Note that the sipe 51 and the shoulder narrow groove 52 are apart from each other, not continuous to each other. A corner portion in contact with the outer lug groove 30 and the inner lug groove 20 includes a chamfer 53.

Figure 4:
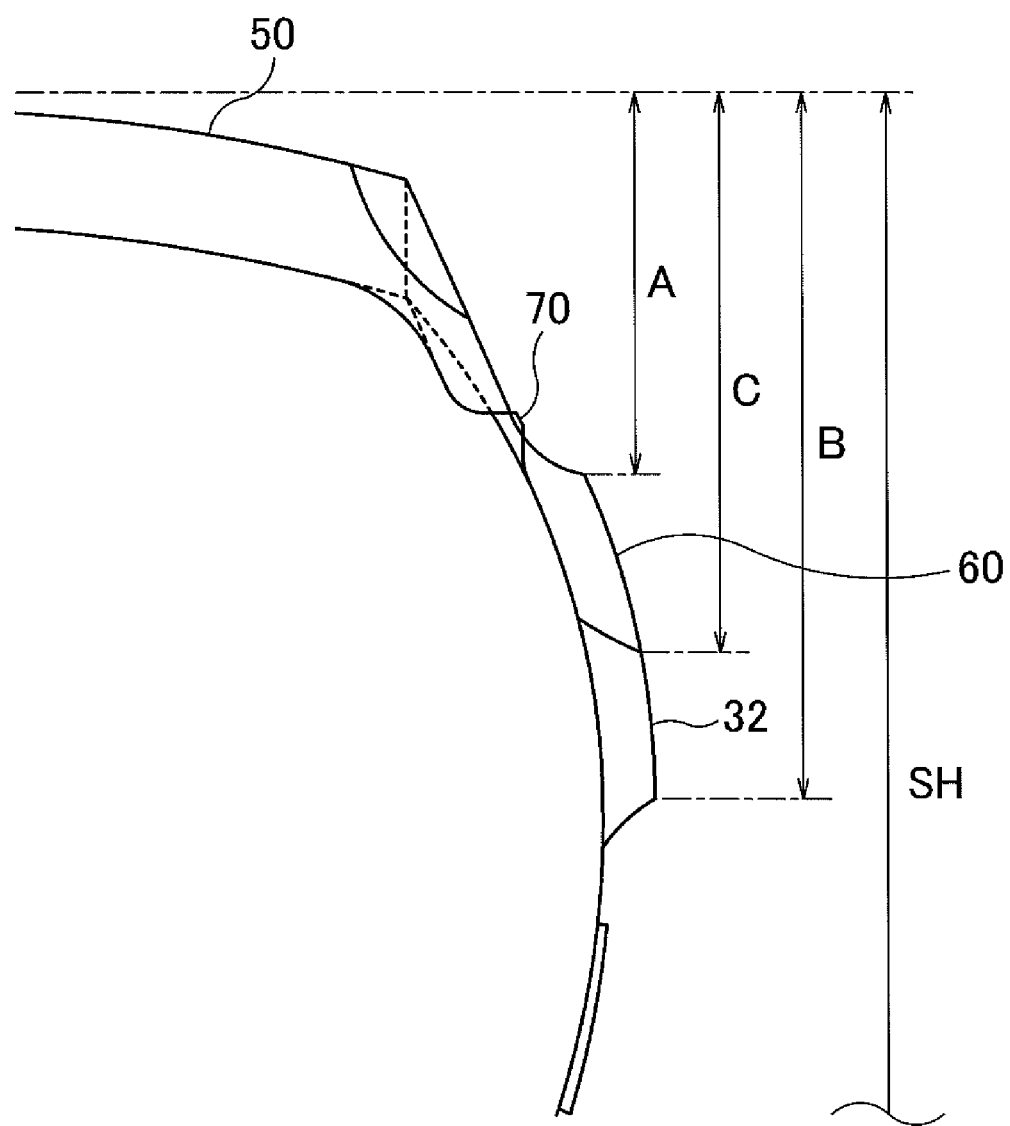
FIG. 4 is an enlarged meridian cross-sectional view illustrating a part of a shoulder block and a side block according to the present technology.

As illustrated in FIGS. 2 and 3, the respective side blocks 60 are defined between the outer lug grooves 30 adjacent to each other in the tire circumferential direction and located outward of the shoulder block 50 in the tire width direction. The side block 60, which is provided continuous to the shoulder block 50 to form a series of blocks, is ridged higher than the shoulder block 50 as illustrated in FIG. 4. In other words, a ridged portion of the block defined by the outer lug grooves 30 corresponds to the side block 60, and the other portion corresponds to the shoulder block 50. Note that in FIGS. 2 and 3, the broken line on a sidewall portion of the side block 60 indicates a height position of a wheel tread of the shoulder block 50 at the boundary between the shoulder block 50 and the side block 60. That is, in the side block 60 in the illustrated example, a portion inward of the broken line is ridged higher than the shoulder block 50, and a portion outward of the broken line is flush with the shoulder block 50 (corresponding to a portion where the shoulder block 50 and the side block 60 are connected) or is recessed below the shoulder block 50 (corresponding to a groove wall of the outer lug groove 40 adjacent to the side block 60).

Some (closed lug groove 30A) of the plurality of outer lug grooves 30 include a ridge portion 32 between the side blocks 60 adjacent to each other in the tire circumferential direction. The ridge portion 32, which is continuous to the side blocks 60 provided on both sides in the tire circumferential direction, of the outer lug groove 30 (closed lug groove 30A) including the ridge portion 32, closes the outer lug groove 30 (closed lug groove 30A). On the other hand, the ridge portion 32 includes a first narrow groove 33 of a smaller groove width and depth than the outer lug groove 30, which extends in the tire width direction on the extension of the outer lug groove 30. At least one end of the first narrow groove 33 penetrates toward the outer lug groove 30 (closed lug groove 30A) or the sidewall portion 2. Note that one end of the first narrow groove 33 in the illustrated example penetrates toward the outer lug groove 30 (closed lug groove 30A) and bends at some midpoint in the extending direction, and the other end penetrates toward the sidewall portion 2.

According to the present technology, the outer lug groove 30, the shoulder block 40, the side block 50, etc. in the shoulder region have a particular configuration so that the sidewall portion 2 can catch rock, etc. if contacting rock, etc. upon driving on rocky ground, etc., thereby enhancing rock performance, as well as can suppress side cuts, etc., and thereby increasing cut resistance. Thus, the configuration of the center region is not limited to the configuration described above.

In the tire configured as described above, first of all, the outer lug grooves 30 are formed up to the sidewall portion 2 beyond the shoulder region, and the outer lug grooves 30 define the blocks (shoulder block 50 and side block 60), by which an adequate recess and protrusion forms over a region from the shoulder region up to the sidewall portion 2 to achieve high rock performance. In particular, the side block 60 is ridged higher than the shoulder block 50 to form an adequate recess and protrusion on an outer side (sidewall portion 2 side) in the tire width direction, so that the sidewall portion 2 can catch rock, etc. when contacting the rock, etc., and in turn, high rock performance is achieved. On the other hand, the ridge portion 32 is formed within the outer lug groove 30 and is continuous to the side block 60, by which occurrences of the side cuts can be suppressed and in turn, cut resistance can be increased. Moreover, the first narrow groove 33 formed in the ridge portion 32 can compensate for an edge that is reduced in accordance with the formation of the ridge portion 32, so as to achieve high rock performance.

In this case, provided that the side block 60 is not ridged, an adequate recess and protrusion cannot be formed and thus, rock performance cannot be enhanced. The outer lug groove 30 including no ridge portion 32 is easily susceptible to damage such as side cuts when contacting rock, etc., and has a decreased cut resistance. Provided that the first narrow groove 33 is not provided, the edge is decreased and rock, etc. cannot be properly caught due to the continuous side block 60 and ridge portion 32, resulting in insufficient rock performance.

The ridge portion 32 can be formed in all of the outer lug grooves 30 but it is preferable to alternately arrange the closed lug groove 30A including the ridge portion 32 and the open lug groove 30B not including the ridge portion 32 in the tire circumferential direction as illustrated in the figure. Such an alternate arrangement of the closed lug grooves 30A ensures that the closed lug groove 30A and the open lug groove 30B are necessarily included in a grounded region. Thus, both rock performance and cut resistance can be realized in a well-balanced manner.

As illustrated in the figure, the side block 60 can include a second narrow groove (side narrow groove 61) with a smaller groove width and depth than the outer lug groove 30, which extends in the tire width direction. It is preferable that the second narrow groove (side narrow groove 61) be open at least at an inner end in the tire width direction. In the illustrated example, the second narrow groove is open to the shoulder block 50 side at an inner end in the tire width direction, bent at some midpoint in the extending direction, and is open to the sidewall portion 2 side at the outer end in the tire width direction. In other words, since the side block 60 and the ridge portion 32 are continuous to each other as described above, three narrow grooves (one first narrow groove 33 and two second narrow grooves (side narrow grooves 61)) of a smaller groove width and depth than the outer lug groove 30 are formed in a series of blocks defined by the two side blocks 60 and the ridge portion 32 located therebetween. As such, the formation of the second narrow groove (side narrow groove 61) contributes to increasing the edge in the side block 60. This is advantageously effective in improving rock performance.

As described above, in the case of forming the second narrow groove (side narrow groove 61), it is preferable to form, in the shoulder block 50, the third narrow groove (shoulder narrow groove 52) be continuously to the second narrow groove (side narrow groove 61). It is preferable that the third narrow groove (shoulder narrow groove 52) have a smaller groove width and depth than the outer lug groove 30, extend in the tire width direction, and be open at least at the outer end in the tire width direction. As such, the formation of the third narrow groove (shoulder narrow groove 52) contributes to increasing the edge within the shoulder block 50 as well. This is advantageously effective in increasing rock performance. In particular, the second narrow groove (side narrow groove 61) and the third narrow groove (shoulder narrow groove 52), which are continuous to each other like a single groove, can catch rock, etc., and provide high rock performance. Here, since the side block 60 is ridged higher than the shoulder block 50, the second narrow groove (side narrow groove 61) and the third narrow groove (shoulder narrow groove 52) do not need to be completely connected. As long as the third narrow groove (shoulder narrow groove 52) is formed in the extension line, on the shoulder block 21 side, of the second narrow groove (side narrow groove 61) as illustrated in the figure, the second narrow groove (side narrow groove 61) and the third narrow groove (shoulder narrow groove 52) can be said to be continuous.

On the sidewall portion 2 side of the ridge portion 32, a notch portion 34 can be formed as illustrated in the figure. In the case of forming the notch portion 34 as described above, it is preferable that an outer end in the tire width direction, of the first narrow groove 33, be continuous to the notch portion 34. Moreover, it is also preferable that the second narrow groove (side narrow groove 61) be continuous to the notch portion 34 formed in the ridge portion 32 as illustrated in the figure. In other words, it is preferable that out of three narrow grooves (one first narrow groove 33 and two second narrow grooves (shoulder narrow grooves 52)) formed in a series of blocks defined by the side block 50 and the ridge portion 32, two (one first narrow groove 33 and either one of the two second narrow grooves (shoulder narrow grooves 52)) be continuous to the notch portion as described above. Such formation of the notch portion reinforces engagement with a road surface at more positions upon driving on rocky ground, etc., and thus, ensures higher rock performance.

At the boundary between the shoulder block 50 and the side block 60, a series of step portions 70 can be also provided across the outer lug groove 30, the shoulder block 50, and the side block 60, which extends in the tire circumferential direction as in the illustrated example. Such formation of the step portions 70 contributes to complicating a configuration of a recess and protrusion formed in a region from the shoulder region up to the sidewall portion 2 and provides more edges. This is advantageously effective in enhancing rock performance.

According to the present technology, it is preferable to provide the side blocks 60 in positions covering a range of from 30% to 45% of a tire cross-sectional height SH from an outer diameter position on the tire equator CL to the inner side in the tire radial direction. In other words, it is preferable that a distance A from the outer diameter position on the tire equator CL to the edge of the side block 60 on the shoulder block 50 side be smaller than 30% of the tire cross-sectional height SH, and a distance B from the outer diameter position on the tire equator CL to the edge of the side block 60 on the sidewall portion 2 side be larger than 45% of the tire cross-sectional height SH. Such an arrangement of the side blocks 60 ensures an adequate recess and protrusion in a region that will easily contact rock, etc. upon driving on rocky ground, etc. This is advantageously effective in enhancing the rock performance.

According to the present technology, it is preferable that the edge of the ridge portion 32 on the closed lug groove 30A side be located in a range of from 35% to 45% of the tire cross-sectional height SH from the outer diameter position on the tire equator CL to the inner side in the tire radial direction. In other words, it is preferable that a distance C from the outer diameter position on the tire equator CL to the edge of the ridge portion 32 on the closed lug groove 30A side be in a range of from 35% to 45% of the tire cross-sectional height SH. Such an arrangement of the ridge portion 32 makes it possible to maintain sufficient rock performance as well as improves cut resistance by the use of the ridge portion 32. This is advantageously effective in realizing both of them in a well-balanced manner.

EXAMPLES

Eleven types of pneumatic tires in total, i.e., Conventional Example 1, Comparative Examples 1 and 2, and Examples 1 to 8 were produced under the same conditions. A tire size was LT265/70R17, the basic configuration of FIG. 1 was adopted, and the tread pattern of FIG. 2 was used as a basic pattern and under varying conditions, which were set as shown in Table 1: presence of the ridge portion in the lug groove; presence of the narrow groove in the ridge portion, the side block, and the shoulder block; the depth of the narrow groove; a relationship between the side narrow groove and the shoulder narrow groove (continuous or discontinuous); a ratio A/SH between the distance A from the outer diameter position on the tire equator to the outer end of the side block in the tire radial direction and the tire cross-sectional height SH; a ratio B/SH of the distance B from the outer diameter position on the tire equator to the inner end of the side block in the tire radial direction and the tire cross-sectional height SH; and a ratio C/SH between a distance C from the outer diameter position on the tire equator and the outer end of the ridge portion in the tire radial direction and the tire cross-sectional height SH.

In the example with the narrow groove, as illustrated in the figure, the narrow groove formed in the ridge portion is open to the outer lug groove and the sidewall portion, the narrow groove formed in the side block is open to the shoulder block and the sidewall portion, the narrow groove formed in the shoulder block is open to the side block at one end and is terminated within the block at the other end.

Regarding "presence of narrow groove" in Table 1, a field showing "presence of narrow groove" is set for each of the narrow groove in the ridge portion (field of "ridge portion" in Table 1), the narrow groove (side narrow groove) in the side block (field of "side block" in Table 1), and the narrow groove (shoulder narrow groove) in the shoulder block (field of "shoulder block" in Table 1). Here, since no ridge portion was provided in Comparative Example 1, "-" is entered in the field of "presence of narrow groove" for the field of "ridge portion" in Table 1.

Regarding "depth of narrow groove" in Table 1, a case where the narrow groove has a larger depth than the outer lug groove is indicated by "large", and a case where the narrow groove has a smaller depth than the outer lug groove is indicated by "small". Here, provided that a plurality of narrow grooves are formed, a field of "depth of narrow groove" in Table 1, to which "large" is entered, means that all of the narrow grooves formed have a larger depth than the outer lug groove, and the field to which "small" is entered, means that all of the narrow grooves formed have a smaller depth than the outer lug groove.

These eleven types of pneumatic tires were evaluated for rock performance and cut resistance based on the following evaluation method, and evaluation results are also shown in Table 1.

Rock Performance

The test tires were assembled on wheels having a rim size of 17×8.0JJ, inflated to an air pressure of 450 kPa, and mounted on a pickup truck (test vehicle). Sensory evaluation by a test driver was performed on a rocky test road surface. Evaluation results are expressed as index values with Conventional Example 1 being assigned the index value of 100. Larger index values indicate superior rock performance.

Cut Resistance

The test tires were assembled on wheels having a rim size of 17×8.0JJ, inflated to an air pressure of 450 kPa, and mounted on a pickup truck (test vehicle). After driving on a rocky test road surface, the entire cut length at the side portion was measured. Evaluation results are expressed as index values with the inverse of a measurement value in Conventional Example 1 being assigned the index value of 100. Larger index values indicate a shorter, entire length of a side cut, and superior cut resistance.

TABLE 1

|  |  |  | Conventional Example 1 | Comparative Example 1 | Comparative Example 2 | Example 1 |
|---|---|---|---|---|---|---|
| Presence of ridge portion |  |  | Yes | No | Yes | Yes |
| Presence of narrow groove | Ridge portion |  | No | — | Yes | Yes |
|  | Side block |  | No | No | No | Yes |
|  | Shoulder block |  | No | No | No | Yes |
| Groove depth of narrow grooves |  |  | — | — | Large | Small |
| Relationship between side narrow groove and shoulder narrow groove |  |  | — | — | — | Continuous |
| A/SH × 100 | % |  | 20 | 20 | 20 | 20 |
| B/SH × 100 | % |  | 50 | 50 | 50 | 50 |
| C/SH × 100 | % |  | 40 | — | 40 | 40 |
| Rock Performance | Index value |  | 100 | 105 | 103 | 112 |
| Cut Resistance | Index value |  | 100 | 95 | 98 | 109 |

|  |  | Example 2 | Example 3 | Example 4 | Example 5 |
|---|---|---|---|---|---|
| Presence of ridge portion |  | Yes | Yes | Yes | Yes |
| Presence of narrow groove | Ridge portion | Yes | Yes | Yes | Yes |
|  | Side block | Yes | Yes | Yes | Yes |
|  | Shoulder block | Yes | Yes | Yes | Yes |
| Groove depth of narrow grooves |  | Small | Small | Small | Small |
| Relationship between side narrow groove and shoulder narrow groove |  | Continuous | Continuous | Continuous | Continuous |
| A/SH × 100 | % | 30 | 40 | 20 | 20 |
| B/SH × 100 | % | 50 | 50 | 45 | 40 |
| C/SH × 100 | % | 40 | 45 | 40 | 35 |
| Rock Performance | Index value | 110 | 103 | 109 | 107 |
| Cut Resistance | Index value | 109 | 107 | 105 | 103 |

|  |  | Example 6 | Example 7 | Example 8 |
|---|---|---|---|---|
| Presence of ridge portion |  | Yes | Yes | Yes |
| Presence of narrow groove | Ridge portion | Yes | Yes | Yes |
|  | Side block | No | Yes | Yes |
|  | Shoulder block | Yes | No | Yes |
| Groove depth of narrow grooves |  | Small | Small | Small |
| Relationship between side narrow groove and shoulder narrow groove |  | Continuous | Continuous | Discontinuous |
| A/SH × 100 | % | 20 | 20 | 20 |
| B/SH × 100 | % | 50 | 50 | 50 |
| C/SH × 100 | % | 40 | 40 | 40 |
| Rock Performance | Index value | 109 | 107 | 109 |
| Cut Resistance | Index value | 109 | 109 | 109 |

As apparent from Table 1, compared to Conventional Example 1, rock performance and cut resistance were improved and both of them were achieved in a well-balanced manner in all of Examples 1 to 8. On the other hand, in Comparative Example 1, the absence of a ridge portion within the outer lug groove led to a lower cut resistance. In Comparative Example 2, although the ridge portion was formed and had the narrow groove, the depth of the narrow groove was larger than the lug groove. Consequently, the cut resistance was lowered.

The invention claimed is:
1. A pneumatic tire comprising:
   an annular tread portion extending in a tire circumferential direction;
   a pair of sidewall portions provided on both sides of the tread portion;

a pair of bead portions provided inward of the sidewall portions in a tire radial direction;

a plurality of lug grooves extending in a shoulder region of the tread portion in a tire width direction up to the sidewall portions;

a block defined by the lug grooves;

the block including a shoulder block located on an inner side in the tire width direction, and a side block located outward of the shoulder block in the tire width direction and ridged higher than the shoulder block;

at least a part of the plurality of lug grooves each including a closed lug groove being closed by a ridge portion provided therein, the ridge portion being continuous to the side block located on both sides of the closed lug groove in the tire circumferential direction, the ridge portion including a first narrow groove with a smaller groove width and a smaller groove depth than the lug groove, the first narrow groove extending in the tire width direction, and at least one end of the first narrow groove penetrating toward the closed lug groove or each of the sidewall portions;

the first narrow groove opening to the closed lug groove and one of the sidewall portions; and the side block being ridged higher than a surface of the shoulder block at a boundary between the shoulder block and the side block.

2. The pneumatic tire according to claim 1, wherein the side block is provided in a position covering a range of 30% to 45% of a tire cross-sectional height SH from an outer diameter position on a tire equator to an inner side in the tire radial direction.

3. The pneumatic tire according to claim 1, wherein an edge of the ridge portion on the closed lug groove side is provided within a range of from 35% to 45% of a tire cross-sectional height SH from an outer diameter position on a tire equator to an inner side in the tire radial direction.

4. The pneumatic tire according to claim 1, wherein the side block includes a second narrow groove with a smaller groove width and a smaller groove depth than the lug groove, the second narrow groove extending in the tire width direction, and the second narrow groove is open at least at an inner end in the tire width direction.

5. The pneumatic tire according to claim 4, wherein the shoulder block includes a third narrow groove with a smaller groove width and a smaller groove depth than the lug groove, the third narrow groove extending in the tire width direction, the third narrow groove is open at least at an outer end in the tire width direction, and the second narrow groove and the third narrow groove are continuous to each other.

6. The pneumatic tire according to claim 1, wherein the lug groove not including the ridge portion and the closed lug groove are provided alternately in the tire circumferential direction.

7. The pneumatic tire according to claim 6, wherein the side block is provided in a position covering a range of 30% to 45% of a tire cross-sectional height SH from an outer diameter position on a tire equator to an inner side in the tire radial direction.

8. The pneumatic tire according to claim 7, wherein an edge of the ridge portion on the closed lug groove side is provided within a range of from 35% to 45% of a tire cross-sectional height SH from an outer diameter position on a tire equator to an inner side in the tire radial direction.

9. The pneumatic tire according to claim 8, wherein the side block includes a second narrow groove with a smaller groove width and a smaller groove depth than the lug groove, the second narrow groove extending in the tire width direction, and the second narrow groove is open at least at an inner end in the tire width direction.

10. The pneumatic tire according to claim 9, wherein the shoulder block includes a third narrow groove with a smaller groove width and a smaller groove depth than the lug groove, the third narrow groove extending in the tire width direction, the third narrow groove is open at least at an outer end in the tire width direction, and the second narrow groove and the third narrow groove are continuous to each other.

* * * * *